Patented May 8, 1934

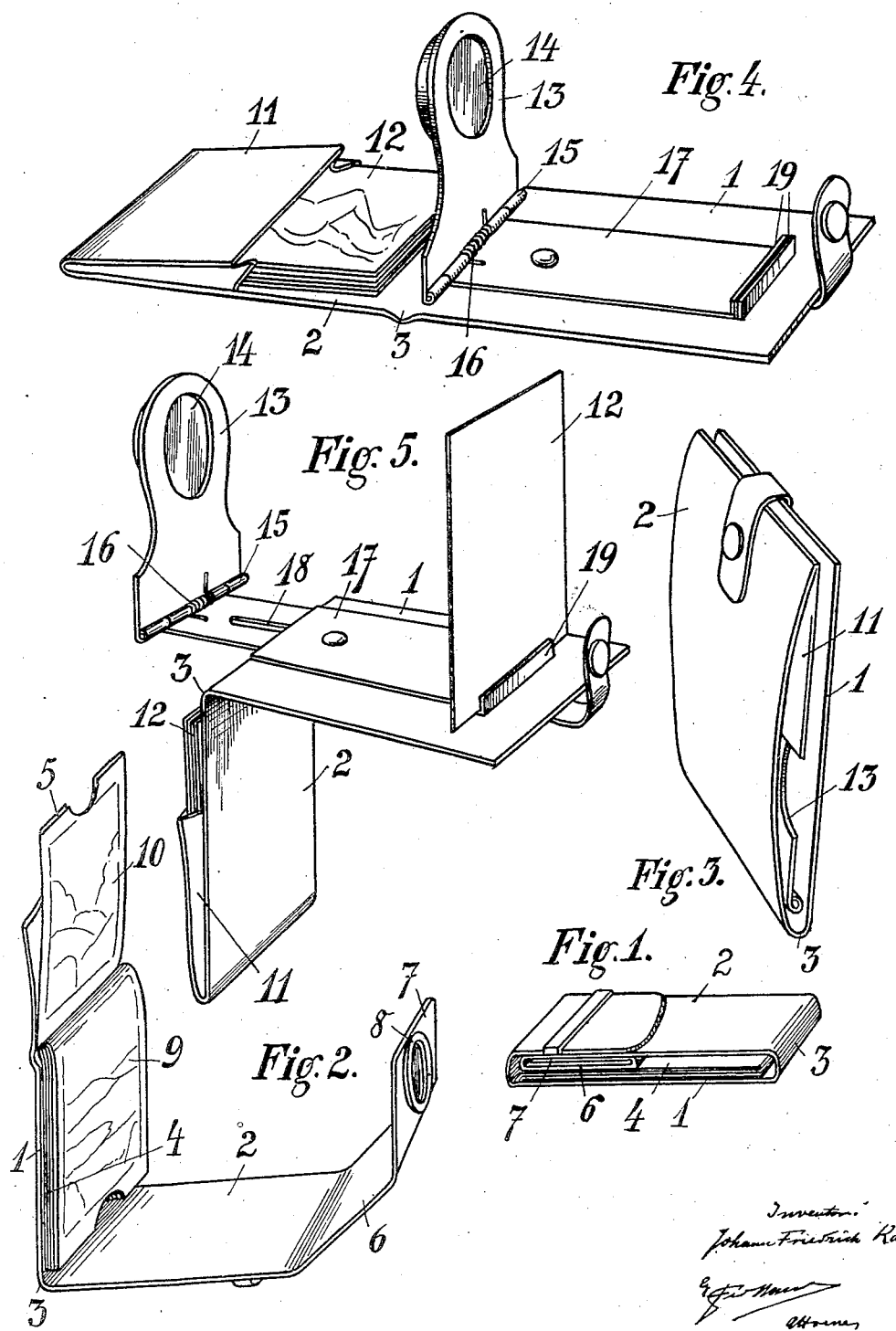

1,957,716

UNITED STATES PATENT OFFICE 1,957,716

ALBUM FOR PHOTOGRAPHIC PICTURES AND THE LIKE

Johann Friedrich Köster, Frankfort-on-the-Main, Germany

Application October 29, 1931, Serial No. 571,801
In Germany September 10, 1931

6 Claims. (Cl. 88—39)

For storing pictures, especially miniature pictures, it is known according to prior application Serial No. 558,086 to utilize the parts of a box-shaped container at the same time as carrier for an adjustable magnifying glass. For example the drawer can carry on a hinge the mounting for the magnifying glass, whereas the casing of the box proper is provided with a holding device for the pictures stored in the container, or the drawer may carry this holding device and the casing the mounting for the magnifying glass.

The magnifying glasses are intended on the one hand to enable the details of relatively small pictures to be observed and to produce a picture in strong relief.

Instead of rigid box-like containers, which are difficult to accommodate in the pockets of articles of clothing, the magnifying glasses according to the invention are connected book-shaped containers, in which the pictures are inserted or fixed in known manner, on foldable surfaces in such a manner that the book-like shape of the container is retained.

Two embodiments of the invention are illustrated by way of example in the accompanying drawing in which:—

Fig. 1 shows the book-like container folded ready for placing in the pocket.

Fig. 2 shows the container in position for observing the pictures.

Fig. 3 shows a modified form of container in closed position.

Fig. 4 shows this modified form in half open position and

Fig. 5 shows this modified form in completely open position.

In the drawing 1 and 2 designate the book covers, which are connected by a flexible back 3. On the cover 1 pictures or photographs are either pasted in known manner on leaves 4 or enclosed in transparent envelope-like containers, which are connected together like the leaves of a book at their front edge so that the pictures can be slipped in to the envelope-like containers, for example through a slot 5.

The mounting 7 for a magnifying glass 8 is fixed to the cover 2 by means of a flexible piece of material 6. Owing to the leaf-shaped mounting 7 of the magnifying glass 8 it can on the one hand be folded between or on the covers 1 and 2 of the book-shaped container and on the other hand, as shown in Fig. 2, owing to the flexible intermediate piece 6 serving as hinge, it can be brought into the position for observation. In the form of construction illustrated in Figs. 1 and 2 two observing positions exist according to whether the picture 9 is observed on the rear side of a leaf or the picture 10 on the other side of the leaf is to be observed.

In the form of construction illustrated in Figs. 3 to 5 a pocket 11 is mounted on the book cover 2, and in this pocket the pictures 12 are slipped. The leaf-shaped mounting 13 for the magnifying glass 14 is mounted on the book back 3 by means of a hinge 15 provided with a spring 16. When the two book covers 1 and 2 are folded apart around the back 3 by opening the book, that is are moved from the position shown in Fig. 3 into that shown in Fig. 4, the mounting 13 automatically jumps with the magnifying glass into the position of observation. Two clamping bars 19 are mounted on the cover 1, between which bars a picture 12 can be inserted, as shown in Fig. 5. In order to enable the mounting 13 and the magnifying glass 14 to be brought into the proper position to suit the eye of the observer, as in the case of the example illustrated in Figs. 1 and 2, the mounting 13 and the hinge 15 are mounted on a carrier 18, which can be slipped in and out of a flat holder 17. Consequently, the magnifying glass 14 opposite the picture clamping bars 19 can easily be brought from the position shown in Fig. 4 into that shown in Fig. 3, the book cover 2 serving as handle when observing the pictures.

Whereas in the form of construction illustrated in Figs. 1 and 2 the book-shaped container has substantially the shape of an ordinary album, in the construction according to Fig. 5 the book-shaped container is more in the shape of a wallet-book. An important feature in both forms of construction is, that the magnifying glass is foldable within the book, in the thickness of a leaf or a small pile of leaves, owing to the leaf-shaped construction of the carrier parts so that the character of the book or wallet is not lost by the combination with the magnifying glass. The magnifying glass is preferably made about the size of a pocket mirror so that the book-shaped container can also be made very small, for example for observing miniature pictures.

I claim:—

1. In a device of the kind described, a pair of cover members connected by a flexible back, a hinge element normally located adjacent the flexible back, a reinforcing member fixed to one of said cover members and having card holding means at the end remote from the hinge element, and a lens support at the remaining end of the reinforcing member and free from the second cover member, said second cover member being foldable downwardly to provide handle means for the first cover member and the parts carried thereby.

2. In a device of the kind described, a pair of cover members connected by a flexible back, a hinge element normally located adjacent the flexible back, a reinforcing member fixed to one of said cover members and having card holding means at the end remote from the hinge element, a lens support at the remaining end of the reinforcing member and free from the second cover member, said second cover member being foldable downwardly to provide handle means for the first cover member and the parts carried thereby, and a pocket on said second cover member adapted to receive cards whereby the second member is stiffened when used as a handle.

3. In a device of the kind described, a pair of cover members connected by a flexible back, a hinge element normally located adjacent the flexible back, a reinforcing member fixed to one of said cover members and having card holding means at the end remote from the hinge element, said reinforcing member constituting a guide open at the end adjacent the flexible back, a slide fitting in said guide with its outer end connected to the hinge element and slidable inwardly and outwardly of the guide, and a lens support carried by the hinge element.

4. In a device of the kind described, a pair of cover members connected by a flexible back, a hinge element normally located adjacent the flexible back, a reinforcing member fixed to one of said cover members and having card holding means at the end remote from the hinge element, said reinforcing member constituting a guide open at the end adjacent the flexible back, a slide fitting in said guide with its outer end connected to the hinge element, and slidable inwardly and outwardly of the guide, and a lens support carried by the hinge element, the second cover member being foldable downwardly to form a handle for the first cover member and the parts carried thereby.

5. In a device of the kind described, a pair of cover members connected by a flexible back, a hinge element normally located adjacent the flexible back, a reinforcing member fixed to one of said cover members and having card holding means at the end remote from the hinge element, said reinforcing member constituting a guide open at the end adjacent the flexible back, a slide fitting in said guide with its outer end connected to the hinge element and slidable inwardly and outwardly of the guide, a lens support carried by the hinge element, the second cover member being foldable downwardly to form a handle for the first cover member and the parts carried thereby, and a pocket on said second cover member adapted to receive cards whereby the second member is stiffened when used as a handle.

6. An album comprising foldable covers connected by a flexible back, picture holding means on one of said covers, a hinge element normally located in proximity of the flexible back and between said covers, a magnifying glass carried by said hinge element for folding between said covers when closed and automatically adjusted permitting observation of the pictures when opened, a sheath-like holder on one of said covers, a picture clamp on said holder, a shiftable slide on said holder and said hinge being on the free end of the slide.

JOHANN FRIEDRICH KÖSTER.